(12) United States Patent
Chow et al.

(10) Patent No.: US 9,884,291 B2
(45) Date of Patent: Feb. 6, 2018

(54) SYSTEMS AND METHODS FOR IMPROVED SULFUR RECOVERY FROM CLAUS PROCESS TAIL GAS

(71) Applicant: Fluor Technologies Corporation, Sugar Land, TX (US)

(72) Inventors: Thomas King Chow, Irvine, CA (US); Curt Graham, Mission Viejo, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

(21) Appl. No.: 15/225,057

(22) Filed: Aug. 1, 2016

(65) Prior Publication Data

US 2017/0036163 A1 Feb. 9, 2017

Related U.S. Application Data

(60) Provisional application No. 62/201,865, filed on Aug. 6, 2015.

(51) Int. Cl.
*B01D 53/86* (2006.01)
*B01D 53/52* (2006.01)
(Continued)

(52) U.S. Cl.
CPC ..... *B01D 53/8606* (2013.01); *B01D 19/0036* (2013.01); *B01D 53/1468* (2013.01);
(Continued)

(58) Field of Classification Search
CPC ............ B01D 53/8606; B01D 53/1493; B01D 53/1481; B01D 53/1468; B01D 53/1425;
(Continued)

(56) References Cited

U.S. PATENT DOCUMENTS 3,752,877 A    8/1973  Beavon
4,981,661 A *  1/1991  Borsboom ................ C01B 3/48
                                                           423/230
(Continued)

FOREIGN PATENT DOCUMENTS

EP    0140191 A2 *  5/1985  ......... B01D 53/1468
EP    0140191 A3 *  9/1988  ......... B01D 53/1468
(Continued)

OTHER PUBLICATIONS

PCT Application No. PCT/US2016/045021, International Search Report and Written Opinion, dated Nov. 4, 2016, 11 pages.

*Primary Examiner* — Timothy C Vanoy
(74) *Attorney, Agent, or Firm* — Conley Rose, P.C.

(57) ABSTRACT

A system for reducing $SO_2$ emissions comprises a hydrogenation reactor, a tail gas cooler, a contact condenser, a hydrolysis reactor, and an absorber. The hydrogenation reactor is configured to receive a Claus tail gas and convert at least a portion of $SO_2$ in the Claus tail gas to $H_2S$ to produce a hydrogenated Claus tail gas stream. The hydrolysis reactor is configured to convert at least a portion of COS to $H_2S$. The absorber comprises an amine-based solvent and is configured to absorb at least a portion of the $H_2S$ and recycle the $H_2S$ to the Claus plant.

19 Claims, 5 Drawing Sheets

(51) Int. Cl.
    *B01D 53/78*     (2006.01)
    *C01B 17/16*     (2006.01)
    *B01D 53/14*     (2006.01)
    *B01D 19/00*     (2006.01)
    *B01D 53/62*     (2006.01)
    *B01D 53/75*     (2006.01)

(52) U.S. Cl.
CPC ............. *B01D 53/62* (2013.01); *B01D 53/75* (2013.01); *B01D 53/8609* (2013.01); *C01B 17/164* (2013.01); *C01B 17/165* (2013.01); *C01B 17/167* (2013.01); *B01D 53/1425* (2013.01); *B01D 2251/202* (2013.01); *B01D 2251/304* (2013.01); *B01D 2252/204* (2013.01); *B01D 2257/302* (2013.01); *B01D 2257/308* (2013.01); *B01D 2257/504* (2013.01); *B01D 2258/0283* (2013.01)

(58) Field of Classification Search
CPC .... B01D 53/52; B01D 53/78; B01D 53/8609; B01D 2252/204; B01D 2258/0283; C01B 17/167; C01B 17/165; C01B 17/164; C01B 17/0404; C01B 17/0456
See application file for complete search history.

(56) References Cited

U.S. PATENT DOCUMENTS

| | | | | |
|---|---|---|---|---|
| 5,676,921 | A | * 10/1997 | Heisel | B01D 53/8612 423/224 |
| 5,716,587 | A | 2/1998 | Khanmamedov | |
| 2002/0094308 | A1 | * 7/2002 | Portz | B01D 53/8612 422/171 |
| 2010/0303700 | A1 | * 12/2010 | Palla | B01D 53/1418 423/242.1 |

FOREIGN PATENT DOCUMENTS

| | | |
|---|---|---|
| KR | 20120047253 A | 5/2012 |
| WO | 2014142668 A2 | 9/2014 |

* cited by examiner

SYSTEMS AND METHODS FOR IMPROVED SULFUR RECOVERY FROM CLAUS PROCESS TAIL GAS

CROSS-REFERENCE TO RELATED APPLICATIONS

This application claims priority to U.S. Provisional Application No. 62/201,865, filed on Aug. 6, 2015 and entitled "Systems and Methods for Improved Sulfur Recovery from Claus Process Tail Gas," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Sulfur is a major contaminant in raw materials used in petrochemical production, with extensive regulations in place to minimize the sulfur content of final products. In most regions, hydrotreatment results in the removal of sulfur from various liquid and gas streams in the form of hydrogen sulfide ($H_2S$). This $H_2S$ is then further treated to recover elemental sulfur (S), typically by the Claus process.

The Claus process utilizes heat, catalysis, and oxygen ($O_2$) to convert a portion of the recovered $H_2S$ to sulfur dioxide, as follows:

$$2H_2S + 3O_2 \rightarrow 2SO_2 + 2H_2O + \text{heat.}$$

The resulting mixture of $H_2S$ and $SO_2$ reacts to produce elemental sulfur, as follows:

$$2H_2S + SO_2 \rightarrow 3S + 2H_2O$$

This second reaction is commonly referred to as the Claus reaction. While a large amount of sulfur can be recovered as elemental sulfur in such a process, in real world processes, reactors performing the Claus reaction produce a tail gas that includes $H_2S$, hydrogen ($H_2$), carbon monoxide (CO), carbon disulfide ($CS_2$), sulfur dioxide ($SO_2$), and carbonyl sulfide (COS). In order to meet sulfur emission targets, such Claus tail gas frequently requires additional treatment.

Conventional Hydrogenation/Formulated Amine Claus Tail Gas Treating Unit (TGTU) is capable of reducing the $H_2S$ concentration of a hydrogenated/hydrolyzed Claus Tail Gas to about 5 ppmv. However, due to high $CO_2$ content (usually above 40% in the acid gases of coal gasification and gas plant facilities), the COS concentration in the subsequent hydrogenated/hydrolyzed. Claus tail gas will be very high, typically between 100-300 ppmv. This is due to the chemical and thermal equilibrium of the following reaction:

$$CO_2 + H_2S \leftrightarrow COS + H_2O$$

While amine-containing solutions are effective in recovering $H_2S$, such solutions have little effect on the COS component in this hydrogenated/hydrolyzed Claus tail gas. As a result, while an amine absorber overhead gas effluent may contain only 5 ppmv or less $H_2S$, it can still contain a substantial amount of sulfur in the form of COS. The total amount of $H_2S$ and COS in such an absorber overhead effluent, following incineration, may result in a $SO_2$ concentration that exceeds what is allowed by local regulations. To reduce the $SO_2$ concentration to below 100-400 mg/Nm³ (milligrams per standard cubic meters, wherein standard conditions are taken at 0° C. and 1013 millibar) can be costly and potentially creates another waste stream to be dealt with (for example, if a caustic wash technology were used as an additional sulfur removal step).

Thus, there is still a need for systems and methods that provide effective and efficient removal of COS from Claus process tail streams.

SUMMARY

A system for reducing $SO_2$ emissions comprises a hydrogenation reactor, a tail gas cooler, a contact condenser, a hydrolysis reactor, and an absorber. The hydrogenation reactor is configured to receive a Claus tail gas and convert at least a portion of $SO_2$ in the Claus tail gas to $H_2S$ to produce a hydrogenated Claus tail gas stream. The Claus tail gas comprises the $SO_2$, COS, and water. The tail gas cooler is fluidly connected to the hydrogenation reactor and configured to cool the hydrogenated Claus tail gas stream to produce a cooled hydrogenated tail gas. The contact condenser comprises an alkaline solution, and the contact condenser is configured to receive a first intermediate treated tail gas stream and produce a second intermediate treated tail gas stream. The hydrolysis reactor is configured to receive a third intermediate treated tail gas stream and convert at least a portion of COS in the third intermediate treated tail gas stream to $H_2S$ to produce a fourth intermediate treated gas stream. The absorber comprises an amine-based solvent and is configured to receive a fifth intermediate treated tail gas stream. The tail gas cooler is interposed between the hydrogenation reactor and the hydrolysis reactor.

In an embodiment, a system for reducing $SO_2$ emissions comprises a conversion reactor, a contact condenser, and an absorber. The conversion reactor comprises a first catalyst and a second catalyst. The first catalyst comprises a hydrogenation catalyst, and the second catalyst comprises a hydrolysis catalyst. The conversion reactor is configured to receive a Claus tail gas stream comprising $SO_2$, COS, and convert at least a portion of the $SO_2$ and the COS to $H_2S$ to produce a treated Claus tail gas stream. The contact condenser comprises an alkaline solution, and the contact condenser is in fluid communication with the conversion reactor. The contact condenser is configured to receive the treated tail gas stream and produce an intermediate treated tail gas stream. The absorber comprises an amine-based solvent and is configured to receive the intermediate treated tail gas stream.

In an embodiment, a method for reducing $SO_2$ emissions from a Claus plant comprises contacting a tail gas stream from a Claus process with a hydrogenation catalyst to produce a hydrogenated tail gas, contacting the hydrogenated tail gas with a hydrolysis catalyst to produce a hydrolyzed tail gas, treating the hydrolyzed tail gas with a contact condenser to produce an extracted tail gas, and treating the extracted tail gas with an amine-based solvent.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment, and may be included in more than one embodiment of the present systems and methods (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

This invention reduces the need to remove $SO_2$ from a volume of incinerator flue gas treated by the Claus process by reducing the COS content of such a treated gas stream prior to the gas stream being treated in an absorber using an amine-based solvent. The high COS concentration in a hydrogenation reactor gas effluent, after being cooled down, is reduced in a COS Hydrolysis Reactor or catalyst bed in which COS is converted to $CO_2$ and $H_2S$. The subsequent treated tail gas is then treated using an amine-based absorber to reduce the $H_2S$ concentration to less than 5 ppmv.

In such a process, the total $H_2S$ and COS content in the amine absorber overhead gas effluent will be greatly reduced, resulting in total $SO_2$ emissions from the incinerator stack flue gas to less than 35 mg/Nm3. The invention is cost effective as the Hydrolysis Reactor can operate at the gas temperature of either the inlet or the outlet of the Contact Condenser so that no additional reheater or cooler is required for its operation. In some aspects, the hydrolysis reactor is a catalyst bed that operates at the conditions of the hydrogenation reactor or hydrogenation catalyst bed.

One should appreciate that the disclosed techniques provide many advantageous technical effects including effectively and efficiently reducing sulfur dioxide waste resulting from combustion of sulfur-containing fossil fuels while not producing an additional waste stream.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 1:
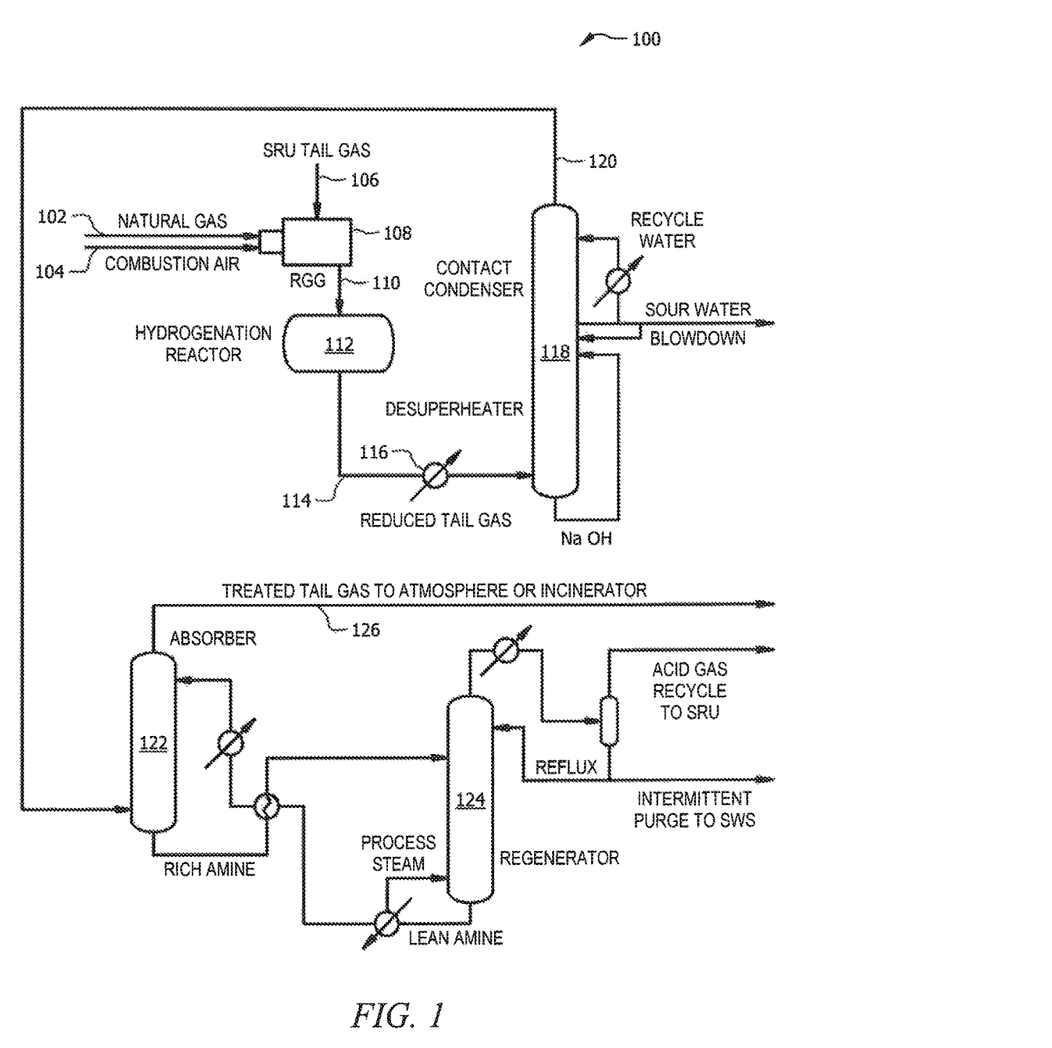
- FIG. 1 illustrates an $SO_2$ recovery system according to an embodiment.
Figure 2:
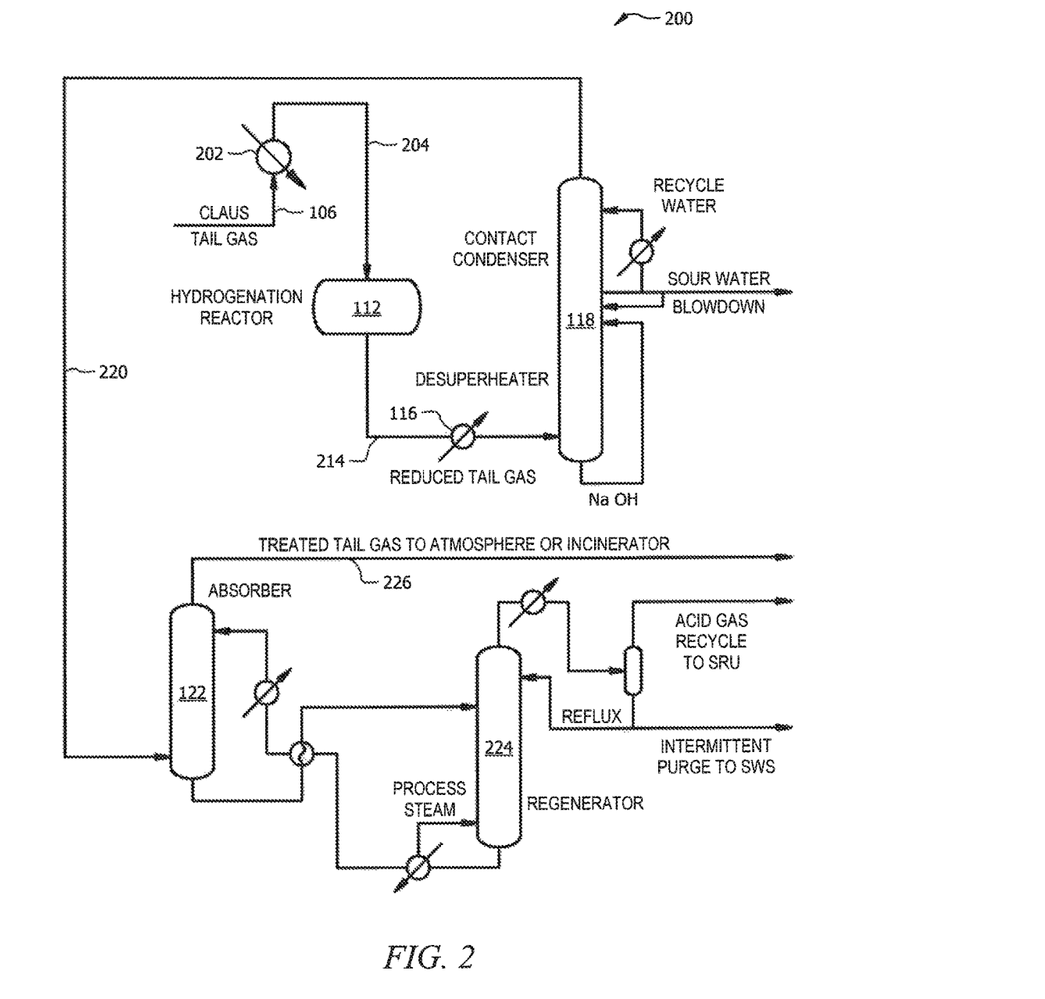
FIG. 2 illustrates another $SO_2$ recovery system according to an embodiment.

Typical examples of treatment systems and methods are shown in FIGS. 1 and 2. As shown in the system 100 of FIG. 1, natural gas 102 and a combustion air stream 104 can be fed to a combustion unit 108 along with an optional sulfur recovery unit tail gas stream 106. The resulting combustion products in the combustion gas stream 110 can be treated in a hydrogenation reactor 112 by passing the combustion gas stream 110 over a hydrogenation catalyst. The combustion gas stream 110 can be at a temperature between about 500 F and about 650 F. Hydrogen can be added to the stream and/or be present based on various reactions prior to the combustion gas stream 110 entering the hydrogenation unit.

Within the hydrogenation reactor 112, sulfur compounds within the combustion gas stream, such as $SO_2$, can be hydrogenated to $H_2S$ in the presence of a hydrogenation catalyst. Suitable catalysts can include those comprising compounds of metals of groups V, VI, and VIII, such as cobalt, molybdenum, chromium, vanadium, thorium, nickel, tungsten, uranium, oxides thereof, and any combinations thereof. The hydrogenation reaction can occur at a temperature between about 420° F. to about 650° F., depending on the hydrogenation catalyst composition. Within the hydrogenation reactor 112, at least about 80%, at least about 90%, at least about 95%, at least about 99%, or substantially all of the $SO_2$ present in the combustion gas stream 110 can be converted to $H_2S$.

The resulting hydrogenated product in stream 114 leaving the hydrogenation reactor 112 can then pass to cooler 116 prior to entering a contact condenser 118. Within the contact condenser 118, an aqueous solution of a base can be used to remove at least a portion of the $CO_2$. A vapor stream 120 leaving the contact condenser 118 can be transferred to an amine absorber 122 to extract any $H_2S$ using an amine-based solvent, which can be transferred to a regenerator 124. The unabsorbed components (e.g., treated tail gas) in stream 126 can be vented to the atmosphere or transferred to an incinerator. The poor solubility of COS in the amine-based solvent can result in any residual COS passing through the amine absorber 122 with stream 126 and being vented to the atmosphere or converted to $SO_2$ upon incineration.

Another example of a system 200 for the removal of sulfur-containing contaminants is shown in FIG. 2. In this system 200, tail gas from a Claus reactor in stream 106 can pass through a heat exchanger 202 before being transferred to a hydrogenation reactor 112. The hydrogenation reactor 112 can be the same or similar to the hydrogenation reactor described with respect to FIG. 1. The products from this reactor can pass out of the hydrogenation reactor 112 in stream 214 and be cooled in cooler 116 prior to being transferred to the contact condenser 118. At least some of the $CO_2$ can be removed within the contact condenser 118. The vapor fraction from the contact condenser 118 can pass out of the contact condenser 118 as stream 220 and be transferred to an absorber 122. Within the absorber 122, the vapor in stream 220 can contact a solvent to absorb acid gas components including, but not limited to, $H_2S$ and $CO_2$. While an amine-based solvent can solvate at least a portion of the $H_2S$ in the stream 220, the solvent is relatively ineffective in solvating COS. The rich solvent can then be transferred to a regenerator 224, while the unabsorbed vapor phase (e.g., the treated tail gas) in stream 226 can be vented to the atmosphere or is transferred to an incinerator. Again, presence of COS in the tail gas leads to release of either COS or $SO_2$ (following incineration) to the atmosphere.

The problem of excessive COS in Claus reactor tail gases can be a particular issue for users in China, as the $SO_2$ emissions limitations stipulated by the Chinese Government (i.e. 100-400 mg/Nm³) are significantly lower than those in other regions of the world (typically 500-750 mg/Nm³). One of the most cost effective and commercially proven Hydrogenation/Amine Claus Tail Gas Treating Unit (TGTU), such as those shown in FIGS. 1 and 2, is not capable of achieving the standards stipulated by the Chinese Government due to the high $CO_2$ content of the acid gases generated in refineries, coal gasification, and gas plant facilities within China.

In systems and methods disclosed herein, a hydrolysis reactor can be used to reduce COS concentration in tail gas prior to treatment in an absorber with an amine-based solvent. Within the hydrolysis reactor, which can include a catalyst, the following reaction takes place:

$$COS+H_2O \leftrightarrow CO_2+H_2S$$

Both $CO_2$ and $H_2S$, in turn, are soluble in the amine-based solvent of the subsequent absorber. This results in greatly reduced transfer of COS to either the atmosphere or to an incinerator subsequent release as $SO_2$). The resulting $H_2S$ that is separated by the amine-based absorber can be separated and sent to a sulfur recovery unit, which can convert the $H_2S$ in the flash gas to elemental sulfur.

Figure 3:
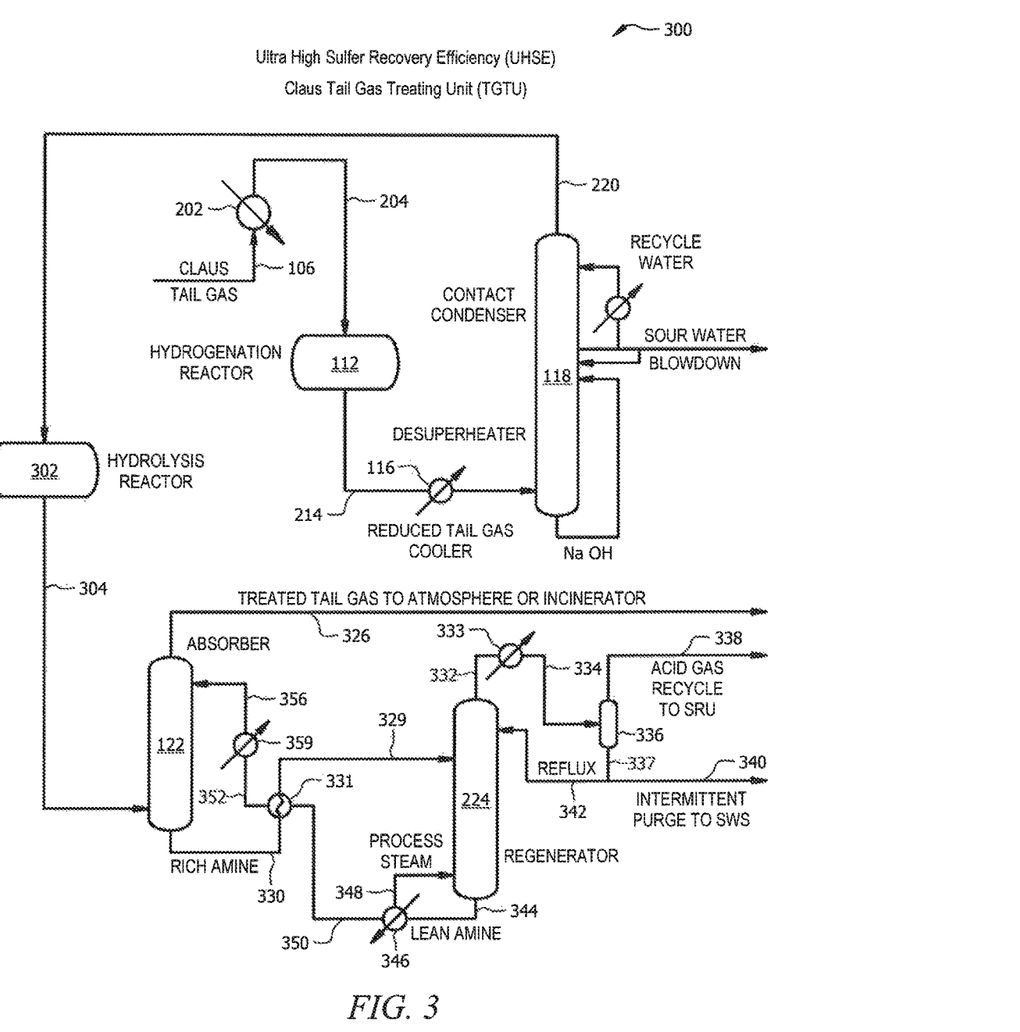
FIG. 3 illustrates an $SO_2$ recovery system comprising a hydrolysis reactor according to an embodiment.

FIG. 3 illustrates another sulfur conversion system 300. In this embodiment, tail gas in stream 106 produced by a Claus process can be cooled in heat exchanger 202 before the cooled stream 204 passes to a hydrogenation reactor 112. The hydrogenation reactor 112 can be the same or similar to the hydrogenation reactor as described with respect to FIG. 1. The cooled stream 204 can enter the hydrogenation reactor 112 and contact the hydrogenation catalyst at a temperature between about 400° F. and about 650° IF or between about 420° F. to about 600° F. Within the hydrogenation reactor 112, at least a portion of any $SO_2$ can be converted to $H_2S$. In general, most of the COS may not be converted within the hydrogenation reactor.

The resulting product stream 214 from the hydrogenation reactor 112 can be cooled in cooler 116 prior to being directed to the direct contact condenser 118. Within the contact condenser 118, an aqueous solution of a base can be used to remove at least a portion of the $CO_2$. The vapor contacting the aqueous solution may be cooled and can pass out of the direct contact condenser 118 as an overhead stream 220.

The overhead stream 220 from the contact condenser 118 can be subsequently directed to a hydrolysis reactor 302 where the vapor stream containing water can contact a catalyst to convert at least a portion of the COS to $H_2S$ and $CO_2$. In general, the tail gas stream 106 entering the system 300 may contain water, for example as a product of combustion. Alternatively or in addition, the aqueous solution used in the direct contact condenser 118 may result in water being transferred to the vapor phase. In either event, the overhead stream 220 can have water present in the vapor during the contact between the overhead stream 220 and the catalyst in the hydrolysis reactor 302.

The overhead stream 220 entering the hydrolysis reactor 302 can have a temperature between about 350° F. to about 620° F. The catalyst used within the hydrolysis reactor 112 can comprise an alumina-based catalyst. Within the hydrolysis reactor 302, the vapor stream can pass through one or more catalyst beds to provide contact with the catalyst. In an embodiment, at least about 1.0%, at least about 20%, at least about 30%, at least about 40%, at least about 50%, at least about 60%, at least about 70%, at least about 80%, at least about 90%, or more than 90% v/v of the COS content in the overhead stream 220 can be converted to $H_2S$ in the hydrolysis reactor 302. As shown in the system 300, the hydrolysis reactor 302 can operate at the outlet temperature of the contact condenser 118.

The resulting output stream 304 from the hydrolysis reactor 302 can be transferred to an absorber 122 that utilizes an amine-based solvent in which at least a portion of the $H_2S$, as well as at least a portion of the CO2, is soluble. The unabsorbed vapor fraction can pass out from the absorber 122 as stream 326, which is reduced in COS content relative to an analogous system that does not include a hydrolysis reactor, and stream 326 can be subsequently vented or transferred to an incinerator.

The portion of the $H_2S$ and $CO_2$ absorbed by the solvent can pass out of the absorber 122 as a rich solvent stream 330. A heat exchanger 331 can be used to heat the rich solvent stream 330 to produce a heated rich solvent stream 329 that can enter the regenerator 224. Within the regenerator, a portion of any acid gases, such as the $H_2S$ and $CO_2$ solvated in the absorber 122, can be released to produce the overhead stream 332, which can be cooled in condenser 333 to produce a two-phase stream 334. A flash tank 336 can receive the two-phase stream 334 and produce a vapor overhead stream 338 containing the acid gases that can be recycled to the sulfur recovery unit and a liquid bottoms stream 337. The bottoms stream 337 can be returned to the regenerator 224 as a reflux stream 342. Art optional purge stream 340 can be split from the bottoms stream 337 as needed.

A bottoms lean solvent stream 344 from the regenerator 224 can pass to a reboiler 346 to produce a steam stream 348 that passes back to the regenerator 224. The heated lean solvent 350 can pass to the heat exchanger 331 where it is cooled by the rich solvent stream 330 to form a cooled lean solvent stream 352, which can be further cooled in exchanger 359 (e.g., an air cooler, etc.) to cool the lean solvent stream 356 prior to the lean solvent stream 356 passing back to the inlet to the absorber 122.

Figure 4:
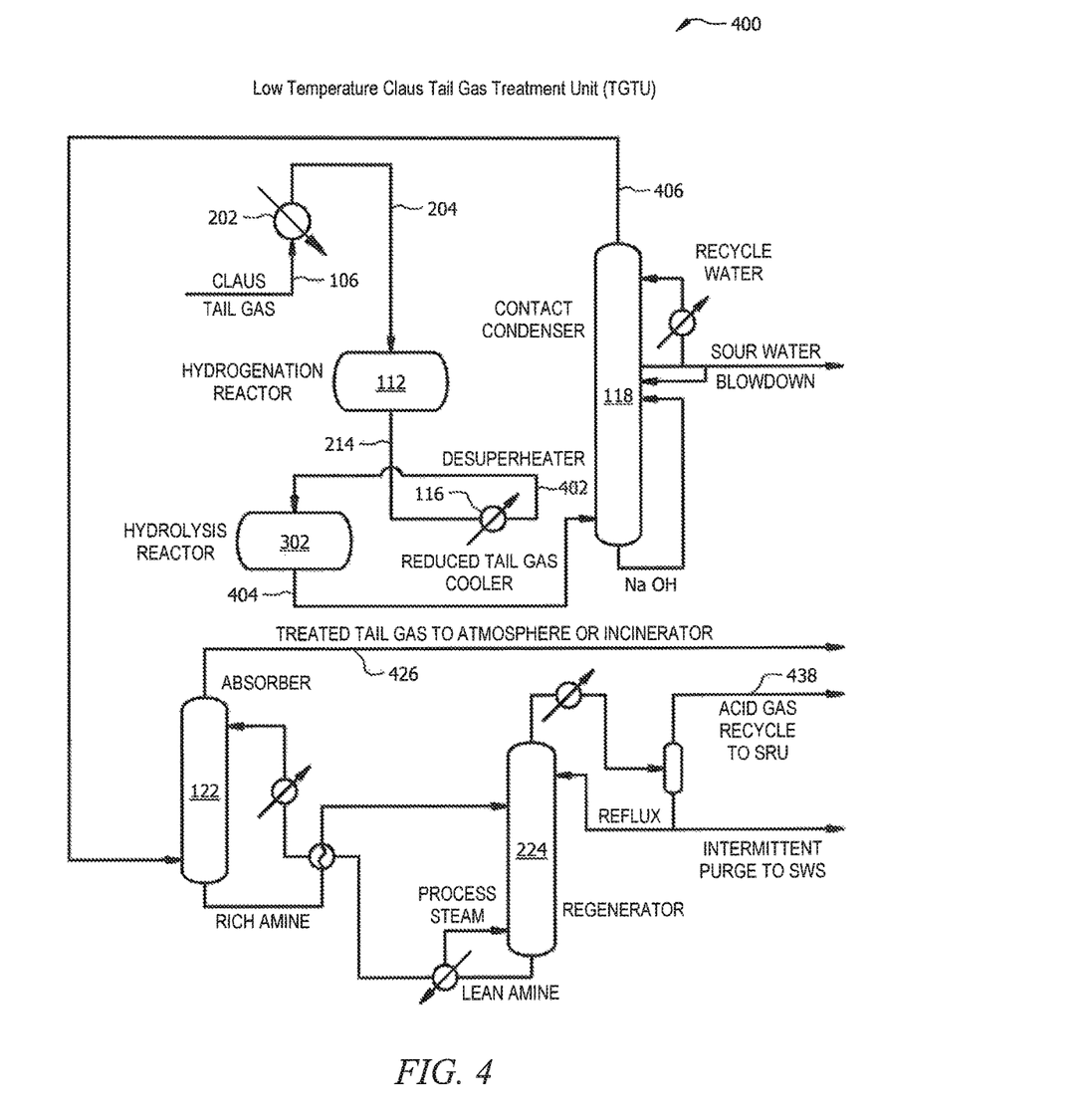
FIG. 4 illustrates another $SO_2$ recovery system comprising a hydrolysis reactor according to an embodiment.

Another embodiment of the sulfur recovery process is shown in FIG. 4. A number of components illustrated in FIG. 4 are the same or similar to those units described above with reference to FIGS. 1-3. Similarly numbered components are not discussed in detail in the interest of brevity. As illustrated, Claus tail gas stream 106 containing significant $CO_2$ can pass through a heat exchanger 202 before being directed to a hydrogenation reactor 112 where at least a portion of any $SO_2$ can be converted to $H_2S$. The output from the hydrogenation reactor 112 can be cooled in a cooler 116 (e.g., a de-superheater, etc.) and transferred to the hydrolysis reactor 302 where at least a portion (for example, at least about 1.0%, at least about 20%, at least about 30%, at least about 40%, at least about 50%, at least about 60%, at least about 70%, at least about 80%, at least about 90%, or more than 90% v/v) of the COS content can be converted to $H_2S$.

The de-superheated stream 402 entering the hydrolysis reactor 302 can have a temperature between about 350° F. to about 620° F.

The output of the hydrolysis reactor 302 can be transferred to the direct contact condenser 118 where it is treated with an alkaline aqueous solution. The vapor phase product in stream 406 from the contact condenser 118 can be transferred to the absorber 122 utilizing an amine-based solvent. The unabsorbed fraction from the absorber 122 in stream 426, which is reduced in COS content relative to an analogous system that does not include a hydrogenation reactor, can be subsequently vented or transferred to an incinerator. Further, the recovered $H_2S$ resulting from both the hydrogenation reactor 112 and the hydrolysis reactor 302 can be recovered from the absorber system as stream 438, which can be recycled to the sulfur recovery unit.

Figure 5:
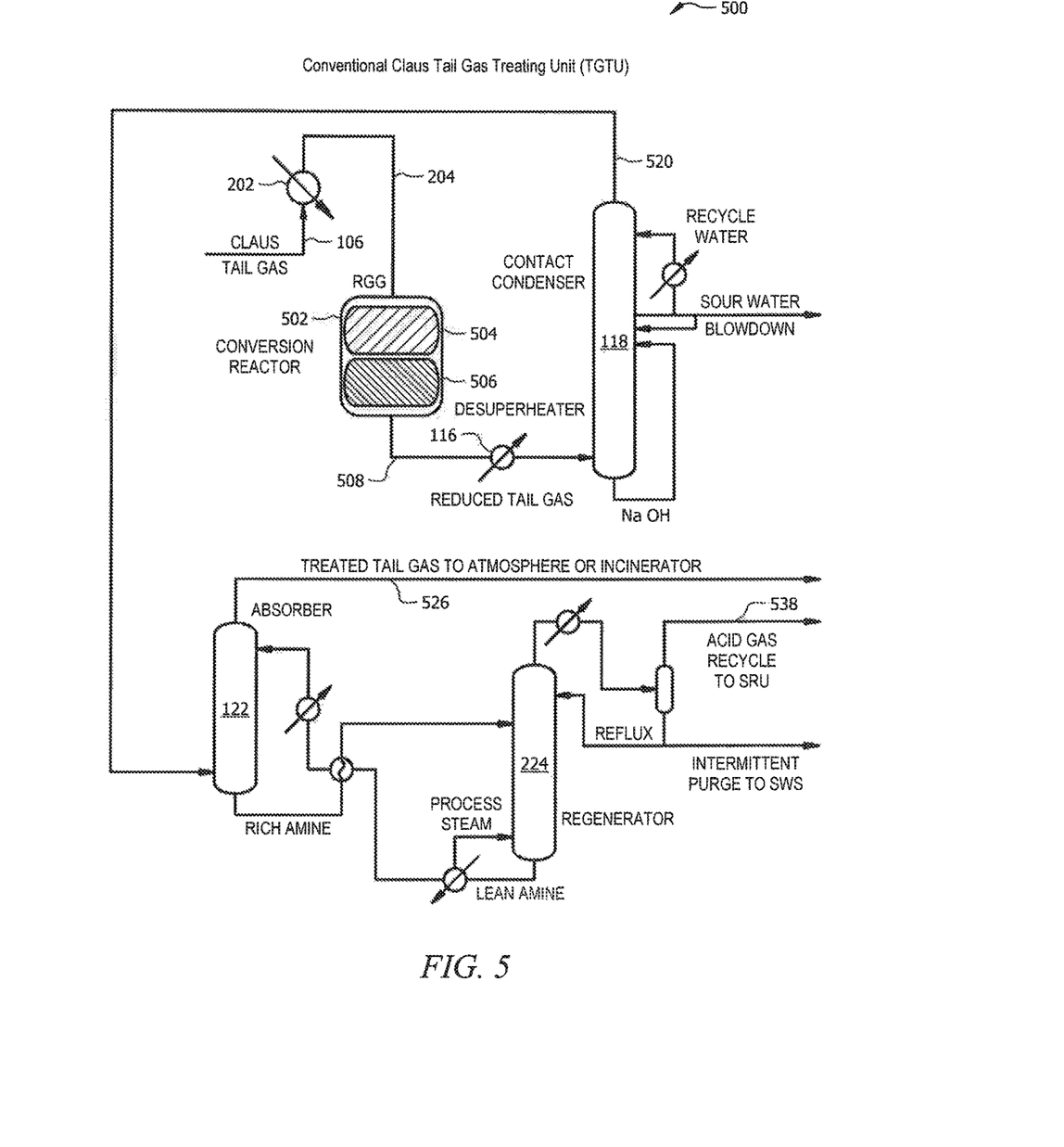
FIG. 5 illustrates an $SO_2$ recovery system comprising a conversion reactor according to an embodiment.

Still another embodiment is illustrated in FIG. 5. A number of components illustrated in FIG. 5 are the same or similar to those units described above with reference to FIG. 14. Similarly numbered components are not discussed in detail in the interest of brevity.

As illustrated, Claus tail gas stream 106 can pass through a heat exchanger 202 before being directed to a conversion reactor 502 as stream 204. The conversion reactor 502 can comprise a plurality of catalyst zones 504, 506. In an embodiment, the first catalyst zone 504 (e.g., the upstream catalyst zone relative to the fluid flow) can comprise a hydrogenation catalyst, and the second catalyst zone 506 (e.g., being downstream of the first catalyst zone 504) can comprise a hydrolysis catalyst. The tail gas stream entering the conversion reactor 502 can first contact the hydrogenation catalyst to hydrogenate at least a portion of the $SO_2$ in the tail gas stream 204 to $H_2S$. The stream can then pass downstream to contact the hydrolysis catalyst in the second catalyst zone 506 to convert at least a portion of any COS to $H_2S$ and $CO_2$. Within the conversion reactor 502, the tail gas stream 204 may pass through both catalyst zones 504, 506 without any intermediate heat exchange or other processing. In an embodiment, the tail gas stream 204 passing into the conversion reactor 502 can have a temperature between about 350° F. to about 620° F., and the temperature can be maintained within this range within the conversion reactor 502. Within the conversion reactor 502, at least a portion (for example, at least about 10%, at least about 20%, at least about 30%, at least about 40%, at least about 50%, at least about 60%, at least about 70%, at least about 80%, at least about 90%, or more than 90% v/v) of the COS content can be converted to $H_2S$.

The resulting product stream 508 from the conversion reactor 502 can then pass to a cooler 116 before passing to the contact condenser 118, where the product stream 508 can be treated with an alkaline aqueous solution. The vapor phase product in stream 520 from the contact condenser 118 can be transferred to the absorber 122 utilizing an amine-based solvent. The unabsorbed fraction from the absorber 122 in stream 526, which is reduced in COS content relative to an analogous system that does not include a hydrogenation reactor, can be subsequently vented or transferred to an incinerator. Further, the recovered $H_2S$ resulting from conversion reactor 502 can be recovered from the absorber system as stream 538, which can be recycled to the sulfur recovery unit.

As described above, the insertion of a COS hydrolysis reactor between a reduced tail gas cooler and a direct contact condenser, in between a direct contact condenser and an amine-based solvent absorber, or as a catalyst zone within a hydrogenation reactor can greatly reduce COS content of the treated tail gas, and provide a simple and cost effective solution without creating an additional waste stream. It should be appreciated that in the examples shown in FIGS. 3 and 4, the temperature of the hydrolysis reactor matches either an input or output temperature of the contact condenser.

Example 1

Systems as shown in FIGS. 3 and 4 were modeled using a process simulator. A sample SRU tail gas composition was input into the model, and the resulting outputs from the hydrolysis reactor were determined to demonstrate the effectiveness of including the hydrolysis unit in the system. Table 1 contains the relative stream compositions of the stream entering the hydrogenation reactor and the effluent stream from the hydrolysis reactor.

TABLE 1

| Wet Composition | Hydrogenation Reactor Inlet Mole % | Hydrolysis reactor Effluent Mole % |
|---|---|---|
| $H_2$ | 2.20 | 3.43 |
| Ar | 0.71 | 0.71 |
| $N_2$ | 60.36 | 60.46 |
| CO | 1.89 | 0.03 |
| $CO_2$ | 5.44 | 7.35 |
| $H_2S$ | 0.54 | 0.94 |
| COS | 0.04 | 1 ppmv |
| $SO_2$ | 0.14 | — |
| $CS_2$ | 0.01 | — |
| $H_2O$ | 28.64 | 27.06 |
| S Vap. as $S_x$ | 0.04 | — |
| Total mole % | 100.00 | 100.00 |
| Temperature ° F. | 554 | 620 |

As shown in Table 1, the COS is reduced from 0.04 mole % to about 1 ppmv in the hydrolysis reactor effluent. The COS is thus converted to $H_2S$ in the hydrolysis reactor, which can be removed in the acid gas removal unit. Thus, the model indicates that the system of FIGS. 3 and 4 is effective for reducing the COS passing through the acid gas removal system, which can lower the overall sulfur losses from the system.

Example 2

The system as shown in FIG. 5 was modeled using a process simulator. A sample SRU tail gas composition was input into the model, and the resulting outputs from the hydrolysis reactor were determined to demonstrate the effectiveness of including the hydrolysis unit in the system. Table 2 contains the relative stream compositions of the stream entering the hydrogenation reactor and the effluent stream from the hydrolysis reactor.

TABLE 2

| Wet Composition | Hydrogenation Reactor Inlet Mole % | Hydrolysis reactor Effluent Mole % |
|---|---|---|
| $H_2$ | 2.40 | 3.65 |
| Ar | 0.69 | 0.69 |
| $N_2$ | 58.60 | 58.69 |
| CO | 2.05 | 0.04 |
| $CO_2$ | 24.50 | 29.87 |
| $H_2S$ | 0.62 | 1.20 |
| COS | 0.64 | 1 ppmv |
| $SO_2$ | 0.21 | — |
| $CS_2$ | 0.15 | — |
| $H_2O$ | 10.09 | 5.86 |
| S Vap. as $S_x$ | 0.05 | — |
| Total mole % | 100.00 | 100.00 |
| Temperature ° F. | 420 | 350 |

As shown in Table 2, the COS is reduced from 0.64 mole % to about 1 ppmv in the hydrolysis reactor effluent. As with Example 1, the COS is thus converted to $H_2S$ in the hydrolysis reactor, which can be removed in the acid gas removal unit. Thus, the model indicates that the system of FIG. 5 is effective for reducing the COS passing through the acid gas removal system, which can lower the overall sulfur losses from the system.

Having described various systems and methods herein, various embodiments can include, but are not limited to:

In a first embodiment, a system for reducing $SO_2$ emissions comprises: a hydrogenation reactor configured to receive a Claus tail gas, and convert at least a portion of $SO_2$ in the Claus tail gas to $H_2S$ to produce a hydrogenated Claus tail gas stream, wherein the Claus tail gas comprises the $SO_2$, COS, and water; a tail gas cooler fluidly connected to the hydrogenation reactor and configured to cool the hydrogenated Claus tail gas stream to produce a cooled hydrogenated tail gas; a contact condenser comprising an alkaline solution, wherein the contact condenser is configured to receive a first intermediate treated tail gas stream and produce a second intermediate treated tail gas stream; a hydrolysis reactor that is configured to receive a third intermediate treated tail gas stream, and convert at least a portion of COS in the third intermediate treated tail gas stream to $H_2S$ to produce a fourth intermediate treated gas stream; and an absorber comprising an amine-based solvent and configured to receive a fifth intermediate treated tail gas stream, wherein the tail gas cooler is interposed between the hydrogenation reactor and the hydrolysis reactor.

A second embodiment can include the system of the first embodiment, wherein the hydrolysis reactor is in fluid communication with the contact condenser, wherein the second intermediate treated gas stream and the third intermediate treated gas stream are the same, and wherein the fourth intermediate treated gas stream and the fifth treated intermediate gas stream are the same.

A third embodiment can include the system of the first embodiment, wherein the hydrolysis reactor is in fluid communication with the reduced tail gas cooler, wherein the cooled reduced tail gas stream is the same as the third intermediate treated tail gas stream, and wherein the first intermediate treated tail gas stream is the same as the fourth intermediate treated gas stream.

A fourth embodiment can include the system of any of the first to third embodiments, wherein the hydrolysis reactor is configured to convert at least 50% of the COS to $H_2S$.

A fifth embodiment can include the system of any of the first to fourth embodiments, further comprising a regenerator that is fluidly coupled to the absorber.

A sixth embodiment can include the system of the fifth embodiment, further comprising a Claus reactor, wherein the Claus reactor is configured to receive a flash gas stream from the regenerator, wherein the flash gas stream comprises $H_2S$ converted from $SO_2$ in the hydrogenation reactor and from COS in the hydrolysis reactor, and wherein the Clause reactor is further configured to convert at least a portion of the $H_2S$ to elemental sulfur.

A seventh embodiment can include the system of any of the first to sixth embodiments, further comprising an incinerator, wherein the incinerator is fluidly coupled to the absorber and is configured to receive a vapor phase from an upper portion of the absorber.

In an eighth embodiment, a system for reducing $SO_2$ emissions comprises: a conversion reactor comprising a first catalyst and a second catalyst, wherein the first catalyst comprises a hydrogenation catalyst, and wherein the second catalyst comprises a hydrolysis catalyst, wherein the conversion reactor is configured to receive a Claus tail gas stream comprising $SO_2$, COS, and convert at least a portion of the $SO_2$ and the COS to $H_2S$ to produce a treated Claus tail gas stream; a contact condenser comprising an alkaline solution, wherein the contact condenser is in fluid communication with the conversion reactor, and wherein the contact condenser is configured to receive the treated tail gas stream and produce an intermediate treated tail gas stream; and an absorber comprising an amine-based solvent and configured to receive the intermediate treated tail gas stream.

A ninth embodiment can include the system of the eighth embodiment, wherein the absorber is configured to absorb at least a portion of the $H_2S$ in the intermediate treated tail gas stream.

A tenth embodiment can include the system of the eighth or ninth embodiment, further comprising a regenerator that is fluidly coupled to the absorber.

An eleventh embodiment can include the system of the tenth embodiment, further comprising a Claus reactor, wherein the Claus reactor is configured to receive a flash gas stream from the regenerator, wherein the flash gas stream comprises $H_2S$ absorbed in the absorber, and wherein the Claus reactor is further configured to convert at least a portion of the $H_2S$ to elemental sulfur.

A twelfth embodiment can include the system of any of the eighth to eleventh embodiments, wherein the hydrolysis catalyst is configured to convert at least 50% of the COS in the Claus tail gas stream to $H_2S$.

In a thirteenth embodiment, a method for reducing $SO_2$ emissions from a Claus plant comprises: contacting a tail gas stream from a Claus process with a hydrogenation catalyst to produce a hydrogenated tail gas; contacting the hydrogenated tail gas with a hydrolysis catalyst to produce a hydrolyzed tail gas; treating the hydrolyzed tail gas with a contact condenser to produce an extracted tail gas; and treating the extracted tail gas with an amine-based solvent.

A fourteenth embodiment can include the method of the thirteenth embodiment, wherein contacting the tail gas stream with the hydrogenation catalyst converts at least a portion of $SO_2$ in the tail gas stream to $H_2S$.

A fifteenth embodiment can include the method of the thirteenth or fourteenth embodiment, wherein contacting the hydrogenated tail gas with the hydrolysis catalyst converts at least a portion of COS in the hydrogenated tail gas to $H_2S$.

A sixteenth embodiment can include the method of any of the thirteenth to fifteenth embodiments, wherein treating the extracted tail gas with an amine-based solvent comprises: contacting the extracted tail gas with a lean solvent; absorbing at least a portion of $H_2S$ in the extracted tail gas into the lean solvent to produce a rich solvent; heating the rich solvent; flashing least the portion of the $H_2S$ in response to the heating; and recovering the $H_2S$.

A seventeenth embodiment can include the method of the thirteenth embodiment, further comprising: cooling the hydrogenated tail gas to produce a cooled tail gas, wherein contacting the hydrogenated tail gas with the hydrolysis catalyst comprises contacting the cooled tail gas with the hydrolysis catalyst.

An eighteenth embodiment can include the method of the thirteenth embodiment, wherein the hydrogenation catalyst and the hydrolysis catalyst are in the same vessel.

A nineteenth embodiment can include the method of the thirteenth embodiment, further comprising: contacting the hydrogenated tail gas with an alkaline solution in a contact condenser, and passing the hydrogenated tail gas from the contact condenser to the hydrolysis catalyst.

A twentieth embodiment can include the method of the thirteenth embodiment, further comprising: contacting the hydrogenated tail gas with an alkaline solution in a contact condenser, wherein contacting the hydrogenated tail gas with the hydrolysis catalyst occurs at an inlet temperature or an outlet temperature of the contact condenser.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, hut shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for reducing $SO_2$ emissions, the system comprising:
    a hydrogenation reactor configured to receive a Claus tail gas, and convert at least a portion of $SO_2$ in the Claus tail gas to $H_2S$ to produce a hydrogenated Claus tail gas stream, wherein the Claus tail gas comprises the $SO_2$, COS, and water;
    a tail gas cooler fluidly connected to the hydrogenation reactor and configured to cool the hydrogenated Claus tail gas stream to produce a cooled hydrogenated tail gas;
    a contact condenser comprising an alkaline solution, wherein the contact condenser is configured to receive a first intermediate treated tail gas stream and produce a second intermediate treated tail gas stream;
    a hydrolysis reactor that is configured to receive a third intermediate treated tail gas stream, and convert at least a portion of COS in the third intermediate treated tail gas stream to $H_2S$ to produce a fourth intermediate treated tail gas stream; and
    an absorber comprising an amine-based solvent and configured to receive a fifth intermediate treated tail gas stream,
    wherein the tail gas cooler is interposed between the hydrogenation reactor and the hydrolysis reactor.

2. The system of claim 1, wherein the hydrolysis reactor is in fluid communication with the contact condenser, wherein the second intermediate treated gas stream and the third intermediate treated gas stream are the same, and wherein the fourth intermediate treated gas stream and the fifth intermediate treated gas stream are the same.

3. The system of claim 1, wherein the hydrolysis reactor is in fluid communication with the reduced tail gas cooler, wherein the cooled reduced tail gas stream is the same as the third intermediate treated tail gas stream, and wherein the first intermediate treated tail gas stream is the same as the fourth intermediate treated tail gas stream.

4. The system of claim 1, wherein the hydrolysis reactor is configured to convert at least 50% of the COS to $H_2S$.

5. The system of claim 1, further comprising a regenerator that is fluidly coupled to the absorber.

6. The system of claim 5, further comprising a Claus reactor, wherein the Claus reactor is configured to receive a flash gas stream from the regenerator, wherein the flash gas stream comprises $H_2S$ converted from $SO_2$ in the hydrogenation reactor and from COS in the hydrolysis reactor, and wherein the Claus reactor is further configured to convert at least a portion of the $H_2S$ to elemental sulfur.

7. The system of claim 1, further comprising an incinerator, wherein the incinerator is fluidly coupled to the absorber and is configured to receive a vapor phase from an upper portion of the absorber.

8. A system for reducing $SO_2$ emissions, the system comprising:
    a conversion reactor comprising a first catalyst and a second catalyst, wherein the first catalyst comprises a hydrogenation catalyst, and wherein the second catalyst comprises a hydrolysis catalyst, wherein the conversion reactor is configured to receive a Claus tail gas stream comprising $SO_2$, COS, and convert at least a portion of the $SO_2$ and the COS to $H_2S$ to produce a treated Claus tail gas stream;
    a contact condenser comprising an alkaline solution, wherein the contact condenser is in fluid communication with the conversion reactor, and wherein the contact condenser is configured to receive the treated tail gas stream and produce an intermediate treated tail gas stream; and
    an absorber comprising an amine-based solvent and configured to receive the intermediate treated tail gas stream.

9. The system of claim 8, wherein the absorber is configured to absorb at least a portion of the $H_2S$ in the intermediate treated tail gas stream.

10. The system of claim 9, further comprising a regenerator that is fluidly coupled to the absorber.

11. The system of claim 10, further comprising a Claus reactor, wherein the Claus reactor is configured to receive a flash gas stream from the regenerator, wherein the flash gas stream comprises $H_2S$ absorbed in the absorber, and wherein the Claus reactor is further configured to convert at least a portion of the $H_2S$ to elemental sulfur.

12. The system of claim 8, wherein the hydrolysis catalyst is configured to convert at least 50% of the COS in the Claus tail gas stream to $H_2S$.

13. A method for reducing $SO_2$ emissions from a Claus plant, comprising:
    contacting a tail gas stream from a Claus process with a hydrogenation catalyst to produce a hydrogenated tail gas;
    cooling the hydrogenated tail gas to produce a cooled tail gas;
    contacting the hydrogenated tail gas with a hydrolysis catalyst to produce a hydrolyzed tail gas, wherein contacting the hydrogenated tail gas with the hydrolysis catalyst comprises contacting the cooled tail gas with the hydrolysis catalyst;
    treating the hydrolyzed tail gas with a contact condenser to produce an extracted tail gas; and
    treating the extracted tail gas with an amine-based solvent.

14. The method of claim 13, wherein contacting the tail gas stream with the hydrogenation catalyst converts at least a portion of $SO_2$ in the tail gas stream to $H_2S$.

15. The method of claim 13, wherein contacting the hydrogenated tail gas with the hydrolysis catalyst converts at least a portion of COS in the hydrogenated tail gas to $H_2S$.

16. The method of claim 13, wherein treating the extracted tail gas with an amine-based solvent comprises:
   contacting the extracted tail gas with a lean solvent;
   absorbing at least a portion of $H_2S$ in the extracted tail gas into the lean solvent to produce a rich solvent;
   heating the rich solvent;
   flashing at least the portion of the $H_2S$ in response to the heating; and
   recovering the $H_2S$.

17. The method of claim 13, wherein the hydrogenation catalyst and the hydrolysis catalyst are in the same vessel.

18. The method of claim 13, further comprising: contacting the hydrogenated tail gas with an alkaline solution in a contact condenser, and passing the hydrogenated tail gas from the contact condenser to the hydrolysis catalyst.

19. The method of claim 13, further comprising: contacting the hydrogenated tail gas with an alkaline solution in a contact condenser, wherein contacting the hydrogenated tail gas with the hydrolysis catalyst occurs at an inlet temperature or an outlet temperature of the contact condenser.

\* \* \* \* \*